April 23, 1929.  L. BAUER  1,709,827
SEPARABLE FASTENER
Filed March 21, 1928
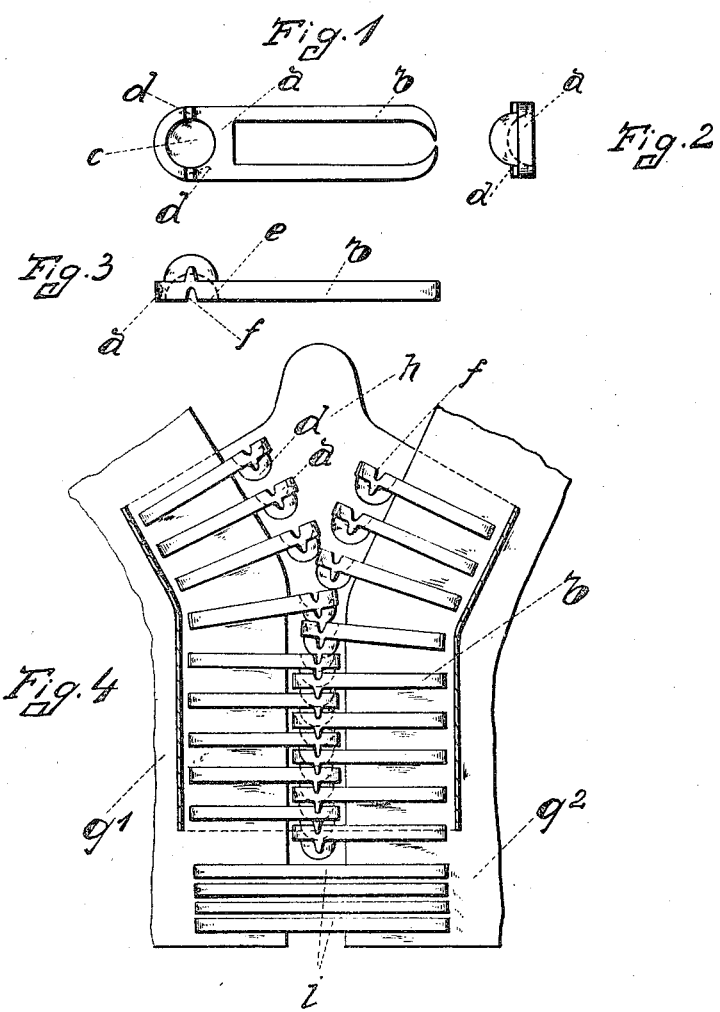
Inventor:
Leo Bauer
by [signature]
Atty.

Patented Apr. 23, 1929.

1,709,827

UNITED STATES PATENT OFFICE.

LEO BAUER, OF HALLE-ON-THE-SAALE, GERMANY.

SEPARABLE FASTENER.

Application filed March 21, 1928, Serial No. 263,334, and in Germany March 24, 1927.

My invention relates to separable fasteners and has particular reference to that type of fastener for garments and other purposes where two flexible stringers are locked and unlocked by a sliding cam mounted on both members, locking being effected by a movement in one direction and unlocking by an opposite movement.

Fasteners of this kind may be provided in connection with stringers of cloth, tape, leather and the like and comprise a set of locking members which are all alike. Various modifications of such fasteners have already been proposed and their properties as to reliability, flexibility and ease of manipulation are determined by the configuration of the cooperating parts.

It is an object of my invention to provide a fastener of the kind described which combines the above mentioned properties with a minimum of friction.

To this end I provide partly spherical locking projections on the mating ends of the members and ribs extending from the projections transversely to the locking members.

Friction is a minimum with members having projections in the shape of a complete sphere but this reduces the strength of the fastener and involves a tendency in the two mating rows of projections to depart from the straight position and to assume angular positions with respect to each other. For operating a fastener which has become distorted in this manner it is necessary to return the several locking projections into their proper locking positions by means of the cam which interferes with the convenience of manipulation.

It has been attempted to overcome these drawbacks by departing from the spherical form of the locking projections. This increases the strength of the fastener but also increases the friction and besides eliminates the possibility of opening and closing the fastener from all sides as the locking projections can only move into operative position in a given direction, longitudinally or transversely, as the case may be.

For large and heavy structures such as tents and the like, considerable stress is exerted on the rows of locking members in the longitudinal and transverse directions by the comparatively large weights suspended from the fasteners. With fully spherical locking projections the strength of the fastener is only small in longitudinal direction, so that the stringers connected by the fasteners sag along their connected edges and the locking members assume angular positions, interfering with the manipulation of the fastener and causing trouble.

These drawbacks are overcome according to my invention.

In the drawing affixed to this specification and forming part thereof, a locking member and a fastener embodying my invention are illustrated diagrammatically by way of example.

In the drawing—

Fig. 1 is a plan view,

Fig. 2 is an end elevation, and

Fig. 3 is an elevation of a locking member,

Fig. 4 illustrates part of a complete fastener.

Referring now to the drawing and first to Figs. 1, 2 and 3, $a$ is the flat body of a locking member, $b$, $b$ are jaws projecting from the body, $c$ is a hemispherical or partly spherical locking projection at the solid end of the member, $d$ are ribs extending from the projection $c$ transversely to the width of the member $a$, $e$ is a cavity in the lower face of the locking member for the reception of the projection $c$ of the adjacent member, and $f$ are recesses for the reception of the ribs $d$.

Referring now to Fig. 4, $g^1$ and $g^2$ are stringers or edges of cloth or the like on which the jaws $b$ are fastened. $h$ is a sliding cam which cooperates with the locking members $a$, and $i$ are stop members for limiting the movement of the cam $h$.

Notwithstanding the engagement of the locking members throughout their width, the fastener is very flexible so that it may be kinked without the locking members becoming disengaged or disaligned so as to interfere with the movement of the cam $h$.

On the other hand, and not-withstanding its flexibility, the fastener is very reliable, does not separate of its own account and under all conditions permits easy movement of the cam $h$ all over its length.

I wish it to be understood that I do not desire to be limited to the exact details of construction shown and described for obvious modifications will occur to a person skilled in the art.

I claim.—

A fastener comprising locking members, a sliding cam adapted to cooperate with said locking members, a partly spherical projection at one side of the mating end of each of said members, ribs extending from each of said projections transversely to each of said members, each of said members having a cavity and recesses on the side opposite said projection and ribs respectively, for the reception of the corresponding parts of the adjacent members.

In testimony whereof I affix my signature.

LEO BAUER.